Figure 1:
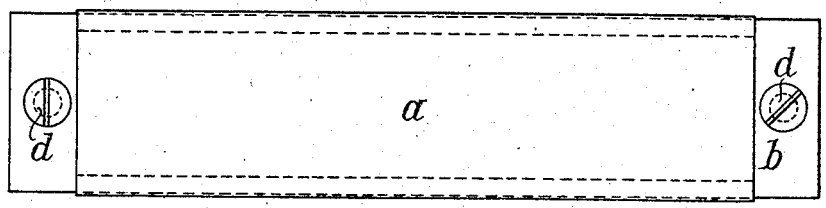

No. 806,413. PATENTED DEC. 5, 1905.
R. KOTHER.
ELECTRODE FOR ELECTROLYZERS USED IN THE MANUFACTURE OF BLEACHING LIQUORS.
APPLICATION FILED SEPT. 7, 1905.

Witnesses:
F. G. Wachenberg.
Henry Thieme

Inventor:
Richard Kother
By Brown & Seward
his Attorneys

UNITED STATES PATENT OFFICE.

RICHARD KOTHER, OF CUNEWALDE, GERMANY, ASSIGNOR OF ONE-HALF TO CHARLES EDWARD WAITHMAN GADDUM, OF MONTFORD, COUNTY OF CHESTER, ENGLAND.

ELECTRODE FOR ELECTROLYZERS USED IN THE MANUFACTURE OF BLEACHING LIQUORS.

No. 806,413.      Specification of Letters Patent.      Patented Dec. 5, 1905.

Application filed September 7, 1905. Serial No. 277,463.

*To all whom it may concern:*

Be it known that I, RICHARD KOTHER, a subject of the King of Saxony, and a resident of Cunewalde, No. 178, Kingdom of Saxony, German Empire, have invented new and useful Improvements in or Relating to Electrodes for Electrolyzers Used in the Manufacture of Bleaching Liquors, of which the following is a specification.

The present invention relates to electrodes such as used in sodium-chlorid electrolyzers for producing bleaching liquors. The manufacture of these apparatus provided with electrodes which keep active for a number of years is very expensive in consequence of the high price of the platinum element, which solely is capable of being used for producing bleaching liquors containing chlorin, that very often instead of platinum graphite carbon is used for making the electrodes, which carbon, however, when used as an anode wears away in a comparatively short time. To be able, therefore, to manufacture such apparatus in a cheaper manner, still using platinum for the electrodes, and to do away with the drawbacks arising in the so-far-known apparatus—such drawbacks being, for instance, the wearing away of the carbon electrodes—the platinum is according to the present invention laid or folded across an insulator either in the form of thin layers or a thin wire-netting in such a manner that the platinum representing the anode covers the insulator entirely on one side and is also folded round the edge of the same. This insulator is then secured to the element acting as cathode and composed of a plate or rod of graphite carbon or other suitable material in a manner to obtain a connection between the platinum acting as the anode and the carbon or other suitable material acting as the cathode without any loss of voltage.

The plates or rods of graphite carbon may be separated by a non-conducting partition of any suitable material into two parts in such a manner that the one part situated in advance of the non-conducting partition acts as the cathode, whereas the part situated on the other side of such partition serves to supply the current to the platinum material acting as the anode. For this purpose the last-mentioned part of the plate or rod is provided on its one or both sides with a non-conducting or insulating protecting-plate and the latter covered with platinum in the shape of a thin platinum foil or a wire-netting. As already stated, instead of the plate of graphite carbon a plate of any other suitable and corresponding material or rods of any suitable shape may be used.

In the accompanying drawings various examples of the present invention are represented.

Figure 2:
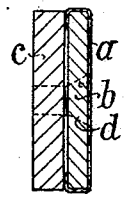
Figure 3:
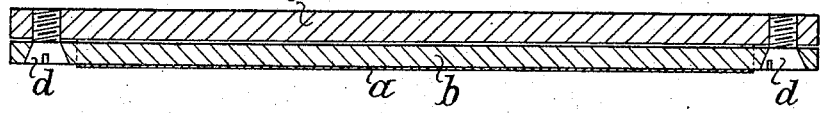
Figure 4:
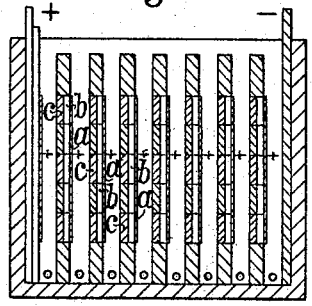

Figure 1 shows in an elevation the mode of fastening a platinum foil on a non-conducting plate fastened to a plate of graphite carbon. Fig. 2 is a cross-section, and Fig. 3 a horizontal section of the electrodes. Fig. 4 shows the arrangement of the electrode according to the present invention in an electrolyzer, and Figs. 5 and 6 show in elevation and cross-section a form of construction in which the platinum in the shape of a wire-netting is fastened to a non-conductor and to the graphite carbon.

As shown in Figs. 1, 2, 3, and 4, the electrode consists of a thin sheet or layer $a$ of platinum, which for reducing the wearing away of the plate $c$ of graphite carbon is folded in the shape of a thin foil over an insulator $b$, of glass, india-rubber, or the like, in such a manner that one side of the insulator is entirely covered with platinum and acts as an anode, whereas the other side of the insulating-plate is only partly covered by platinum through the same having been bent round the edges of the insulator, whereby the platinum only acts as conducting material. Against this latter side a plate of graphite carbon $c$ is attached and pressed—for example, by screws $d$ or the like—whereby the passage of the current from platinum to graphite carbon is obtained without loss of voltage. The use of an insulating-plate $b$ between the graphite carbon plate $c$ and the thin platinum layer or foil $a$ renders it possible to use the latter in extremely thin sheets—for instance, as low as one two-hundredths of a millimeter—as the small holes which naturally arise in so thin a layer of platinum material cannot, owing to the insulator used, according to the present invention destroy in any way the carbon plate acting as the cathode. If the thin layer of platinum were directly secured to the plate of graphite carbon, the platinum layer would have to be made entirely without holes in order to prevent a destruction of the graphite plates. In this case the platinum foils would have to be used representing at least a thickness of one twenty-fifth of a millimeter, as only by using such sizes can thin layers with certainty be obtained without holes.

Figure 5:
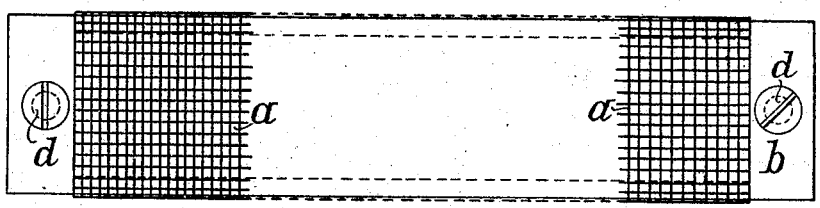
Figure 6:
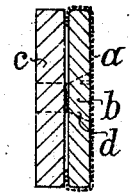

In Figs. 5 and 6 the platinum $a$ is fastened in the shape of a thin platinum net to the insulator $b$ to increase as much as possible the acting surface of the platinum.

What I claim is—

1. In an electrode for use in electrolyzers for producing bleaching liquids, a plate of suitable non-conducting material, a very thin anode element laid on the face of and over edges of the insulating-plate, an element acting as cathode, and means for holding the cathode element in close contact with the turned edges of the anode element.

2. In an electrode for use in electrolyzers for producing bleaching liquids, a plate of suitable non-conducting material, a very thin sheet of platinum laid on the face and over edges of the insulating-plate, an element acting as cathode, and means for pressing the cathode element against the turned edges of the anode at the back of the insulating-plate.

In testimony that I claim the foregoing as my invention I have signed my name, in presence of two witnesses, this 24th day of August, 1905.

RICHARD KOTHER.

Witnesses:
PAUL ARRAS,
GEORG RICHTER.